US012764129B2

(12) United States Patent
Verma et al.

(10) Patent No.: US 12,764,129 B2
(45) Date of Patent: Oct. 13, 2026

(54) SECURITY BREACH DETECTION AND MITIGATION IN A CLOUD-BASED ENVIRONMENT

(71) Applicant: Google LLC, Mountain View, CA (US)

(72) Inventors: Rishi Kishore Verma, Bangalore (IN); Shruti Verma, Vadodara (IN)

(73) Assignee: Google LLC, Mountain View, CA (US)

( * ) Notice: Subject to any disclaimer, the term of this patent is extended or adjusted under 35 U.S.C. 154(b) by 131 days.

(21) Appl. No.: 18/525,261

(22) Filed: Nov. 30, 2023

(65) Prior Publication Data

US 2025/0184335 A1 Jun. 5, 2025

(51) Int. Cl.
*H04L 9/40* (2022.01)
*H04L 41/16* (2022.01)

(52) U.S. Cl.
CPC .......... *H04L 63/1416* (2013.01); *H04L 41/16* (2013.01); *H04L 63/1466* (2013.01)

(58) Field of Classification Search
CPC .. H04L 63/1416; H04L 41/16; H04L 63/1466
See application file for complete search history.

(56) References Cited

U.S. PATENT DOCUMENTS

| | | | | |
|---|---|---|---|---|
| 11,637,862 | B1 * | 4/2023 | Sopan | H04L 63/1416 726/23 |
| 2023/0199003 | A1 * | 6/2023 | Karpovsky | G06N 20/00 726/23 |
| 2023/0421587 | A1 * | 12/2023 | Meyer | H04L 63/1425 |
| 2024/0256678 | A1 * | 8/2024 | Thompson | G06F 21/577 |

* cited by examiner

*Primary Examiner* — Joe Chacko
(74) *Attorney, Agent, or Firm* — Lowenstein Sandler LLP

(57) ABSTRACT

Methods and systems for security breach detection and mitigation in a cloud-based environment are provided herein. Event data associated with client devices of a cloud-based environment are provided as input to a trained artificial intelligence (AI) model. The event data indicates activities performed with respect to the client devices. One or more outputs of the AI model are obtained, the one or more outputs indicating activities, of the event data, that is indicative of a security breach, one or more security actions to be taken at the cloud-based environment in response to the activities, and for each of the one or more security actions, a level of confidence that a respective security action will mitigate the security breach. A security action having a level of confidence that satisfies a confidence criterion is determined. A set of operations to initiate the determined security action at the cloud-based environment is performed.

20 Claims, 8 Drawing Sheets

SECURITY BREACH DETECTION AND MITIGATION IN A CLOUD-BASED ENVIRONMENT

TECHNICAL FIELD

Aspects and implementations of the present disclosure relate to security breach detection and mitigation in a cloud-based environment.

BACKGROUND

Cloud-based systems have revolutionized the way individuals, businesses, and organizations store, process, and access data. These systems provide unparalleled flexibility, scalability, and cost-efficiency. However, the inherent nature of cloud computing also introduces unique security challenges. The dynamic and shared nature of cloud environments increases the complexity of monitoring and detecting security events, making it crucial to develop robust mechanisms for ensuring the integrity and confidentiality of sensitive information. The vast amount of data generated within cloud environments, including logs, network traffic, user activity, etc. poses a significant challenge for manual monitoring and analysis.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a method is disclosed for security breach detection and mitigation in a cloud-based environment. The method includes providing event data associated with client devices of a cloud-based environment as input to a trained artificial intelligence (AI) model. The event data indicates activities performed with respect to the client devices. The method further includes obtaining one or more outputs of the trained AI model, the one or more outputs indicating: a set of activities, of the activities indicated by the event data, performed with respect to at least one of the client devices that is indicative of a security breach, one or more security actions to be taken at the cloud-based environment in response to the set of activities, and for each of the one or more security actions, a level of confidence that a respective security action will mitigate the security breach. The method further includes determining, based on the one or more outputs, a security action having a level of confidence that satisfies a confidence criterion. The method further includes performing a set of operations to initiate the determined security action at the cloud-based environment.

In some embodiments, the method further includes providing indicator of compromise (IOC) data as input to the trained AI model with the provided event data. The IOC data indicates one or more activities pertaining to one or more other security breaches of other cloud-based environments. At least one of the set of activities corresponds to the one or more activities indicated by the IOC data. In some embodiments, the method further includes updating the IOC data to include information pertaining to the set of activities that is indicative of the security breach.

In some embodiments, the set of operations to initiate the determined security action include an operation associated with one or more of: transmitting a security alert to a computing system associated a security authority associated with the determined security action, executing one or more instructions to prevent at least one of the one or more client devices from performing one or more operations for a particular time period executing one or more instructions to prevent at least one of the one or more client devices from accessing a particular type of data, or executing one or more instructions to prevent at least one of the one or more client devices from communicating with another client device.

In some embodiments, performing the set of operations to initiate the determined security action at the cloud-based environment includes determining whether the level of confidence of the determined security action exceeds a threshold level of confidence. Responsive to a determination that the level of confidence of the determined security action exceeds the threshold level of confidence, the method includes executing one or more instructions of a security action protocol associated with the determined security action. Responsive to a determination that the level of confidence of the determined security action does not exceed the threshold level of confidence, the method further includes transmitting a security alert to a computing system associated with a security authority associated with the determined security action.

In some embodiments, the activities indicated by the event data include one or more of processing activities, data access activities, or network-based activities performed with respect to at least one client device of the client devices.

In some embodiments, the AI model includes a neural network.

In some implementations, a system is disclosed. The system includes a memory and a processing device. The processing device is to perform operations including generating, by a processing device, training data for a machine learning model. Generating the training data includes generating a training input including historical event data indicating one or more historical activities performed with respect to at least one client device of a cloud-based environment. Generating the training data further includes generating a target output including an indication of whether the one or more historical activities of the client devices were previously indicated by a security authority to be indicative of a historical security breach and, for a historical activity of the one or more historical activities previously indicated by the security authority to be indicative of the historical security breach, one or more historical security actions initiated by the security authority at the cloud-based environment in response to the historical activity to mitigate the historical security breach. The operations further include providing, by the processing device, the training data to train the AI model to predict activities performed with respect to the plurality of client devices that are indicative of a security breach and one or more security actions to mitigate the security breach, where the training data includes (i) a set of training inputs comprising the training input and (ii) a set of target outputs comprising the target output.

In some embodiments, the one or more historical activities include one or more of historical processing activities, historical data access activities, or historical network-based activities performed with respect to at least one client device of the plurality of client devices.

In some embodiments, the one or more historical security actions include at least one of: executing one or more instructions to prevent at least one of the client devices from performing one or more operations for a particular time period, executing one or more instructions to prevent at least one of the client devices from accessing a particular type of data, or executing one or more instructions to prevent at least one of the client devices from communicating with another client device.

In some embodiments, at least one of the training input or the target output is further generated based on one or more of security rule data associated with a user of the plurality of client devices or indicator of compromise data collected for the cloud-based environment or another cloud-based environment.

In some embodiments, the operations further include identifying a security log comprising an indication of historical activities previously initiated by the security authority in response to the one or more historical activities of the client devices, and extracting the one or more historical activities from the identified security log.

In some embodiments, the AI model is associated with a platform, and wherein the security log is associated with at least one of the platform or another platform.

BRIEF DESCRIPTION OF DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
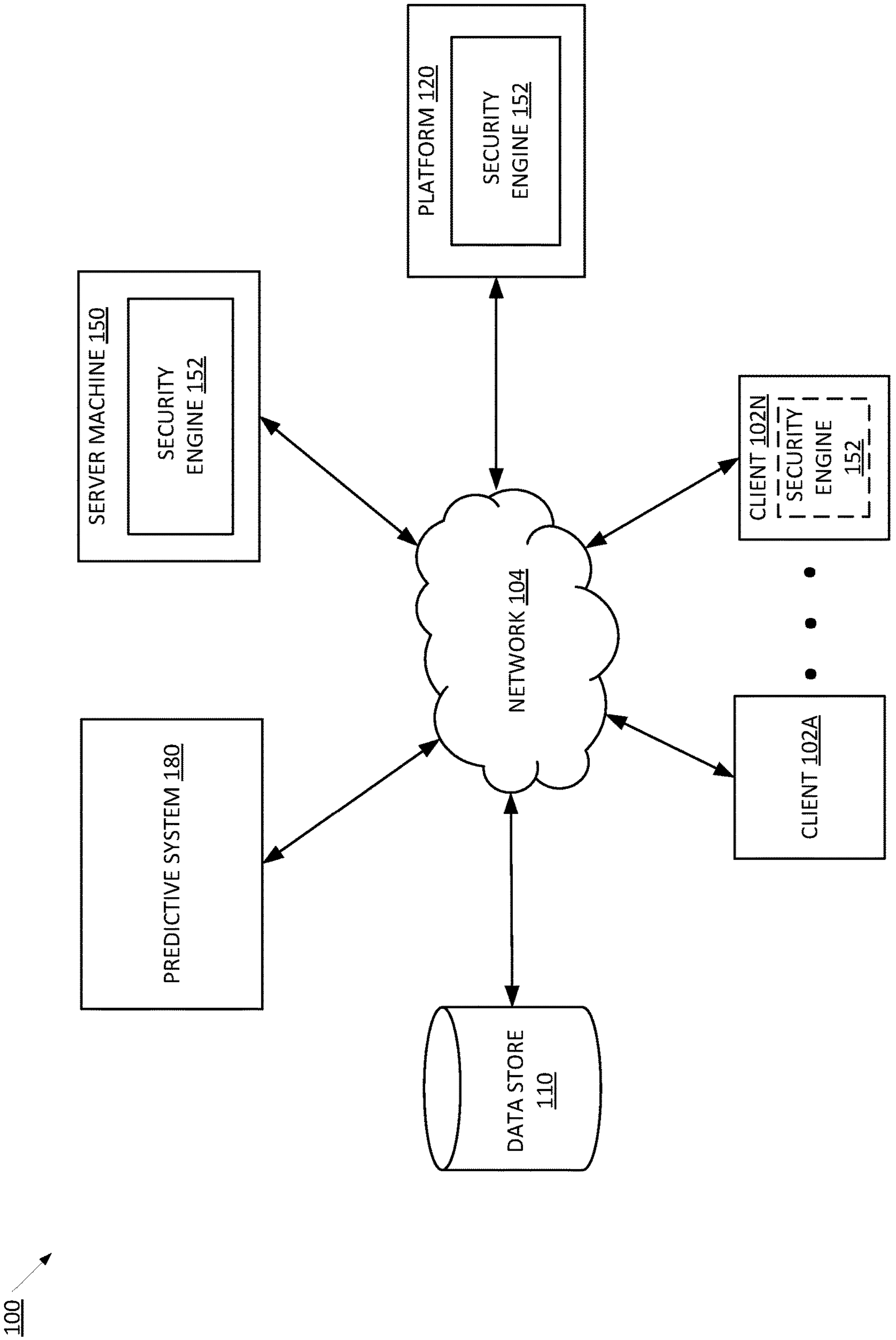
FIG. 1 illustrates an example system architecture, in accordance with implementations of the present disclosure.

Aspects of the present disclosure relate to security breach detection and mitigation in a cloud-based environment. In some instances, a platform (e.g., a security platform) can provide resources or services associated with monitoring activity of one or more client devices of a cloud-based environment to detect a security violation and, in some instances, acting in response to a detected security violation. For example, a user (e.g., an enterprise user) can provide the platform with access to security event logs from client devices of the user's cloud based environment. One or more computing systems of the security platform can compare security events of the security event logs to security rules (e.g., defined by the user) to determine whether a security violation has occurred and, in some instances, which actions should be taken to address the security violation.

Some security platforms implement a hierarchical approach to detecting and handling security violations. For example, upon determining that a security violation has occurred (e.g., based on the comparison to the security events to the security rules), a computing system can forward a security alert to one or more first-tier analysts (e.g., human beings, analyst modules associated with the platform, etc.). In some instances, a first-tier analyst can evaluate the security alert to determine whether the alert is a legitimate alert (e.g., indicative of an actual security breach) and, if so, forwards the alert to a second-tier analyst (e.g., another human being, another analyst module of the platform, etc.) to determine what type of action should be taken to address the security alert. In some instances, the second-tier analyst forwards the alert to a third-tier analyst (e.g., another human being, another analyst module of the platform, etc.), which may be specialized in actions taken to address the specific type of security alert.

In some instances, a computing system can produce a significant number of security alerts, many of which may not be actual security threats and therefore do not need to be escalated to a second-tier or third-tier analyst for action. Such alerts are referred to as "noisy alerts" and consume a large amount of system time and resources. For instance, it can take a significant amount of time, and therefore a large amount of computing resources, for a first-tier analyst to evaluate each security alert issued by the platform and determine whether the security alert should be escalated to a second-tier and/or third-tier analyst, or if the security alert is a "noisy alert" and can be disregarded. Such computing resources are therefore unavailable for other processes of the system, which can increase an overall latency and decrease an overall efficiency of the system. Further, even if a security alert corresponds to an actual security that should be escalated, it can take a significant amount of time for the first-tier analyst to identify the appropriate second-tier analyst and/or third-tier analyst that is capable/specialized in actions to address the security alert. The longer it takes the first-tier analyst to identify the appropriate analyst to forward the security alert, the longer the cloud-based environment may be exposed to security threats and risks that could compromise the security and efficacy of resources in the cloud-based environment. Such security threats and risks could be catastrophic for the resources of the cloud-based environment. Further, as malicious actors become increasingly sophisticated, it can be increasingly difficult for first-tier analysts to accurately determine whether a security alert is a "noisy alert" or a legitimate security violation and for second-tier and/or third-tier analysts to quickly identify appropriate actions to be taken to address a legitimate security violation. This further increases the risk of a catastrophic security threat for a cloud-based environment.

Embodiments of the present disclosure address the above and other deficiencies by providing artificial intelligence (AI) and/or machine learning techniques for security breach detection and mitigation in a cloud-based environment. A platform (e.g., a security platform) can maintain or otherwise have access to one or more AI models associated with security breach detection and/or security breach mitigation in a cloud-based environment. In some embodiments, the one or more AI models can be trained to predict activities performed with respect to one or more client devices of a cloud-based environment that are indicative of a security breach and/or one or more security actions to mitigate the security breach. Such AI models are referred to herein as global security breach models, as such AI models can evaluate event data from multiple client devices to identify a security threat (e.g., globally) within the cloud-based environment. In additional or alternative embodiments, one or more AI models can be trained to predict current activities performed by one or more client devices of the cloud-based environment that deviate from historical activities performed by the one or more client devices and/or one or more security actions to mitigate the security breach. Such AI models are referred to herein as local security breach models, as such AI models can evaluate event data from a particular client device in the cloud-based system to determine whether a current activity of the client device deviates from a historical endpoint activity of the device.

In some embodiments, the global security breach model(s) and/or the local security breach model(s) can be trained based on historical security event data collected for client devices of the cloud-based environment and/or historical security action data indicating one or more security actions performed to mitigate security risks in the cloud-based environment. The AI model(s) can be further trained based on indicator of compromise (IOC) data (e.g., data indicating security breaches at other networks or endpoints). Further details regarding training the AI model(s) are provided with respect to FIGS. 5-7 below.

In some embodiments, multiple client devices of the cloud-based environment can provide the platform with event data indicating activities performed with respect to the client devices. The activities can include processing activities (e.g., the type or frequency of operations performed at a client device), data access activities (e.g., a type or frequency of data accessed by the client device), network-based activities (e.g., entities that transmit or receive data from the client device, a frequency of transmission to such entities, etc.), and so forth. The platform can feed the event data as input to one or more AI models (e.g., global security breach models) and can obtain one or more outputs. In some embodiments, the one or more outputs can indicate a set of activities, of the activities indicated by the event data, that is indicative of a security breach. The one or more outputs can additionally or alternatively indicate one or more security actions to be taken at the cloud-based environment and, for each security action, a level of confidence that the security action will mitigate the security breach. Security actions can include, but are not limited to, preventing one or more client devices of the cloud-based environment from performing one or more operations (e.g., for a particular time period), preventing the one or more client devices from accessing a particular type of data, preventing the one or more client devices from communicating with a particular entity, and so forth.

In additional or alternative embodiments, the event data can indicate one or more current activities associated with a particular client device. The platform can feed the event data as input to one or more AI models (e.g., local security breach models) and can obtain one or more outputs. In some embodiments, the one or more outputs can indicate a current activity of the current activities indicated by the event data that has a degree of deviation from historical activities performed by the client device that is indicative of a security breach. The one or more outputs can additionally or alternatively include one or more security actions to be taken in response to the current activity and, for each security action, a level of confidence that the security action will mitigate the security breach.

In accordance with previously described embodiments, the platform can identify an action, from the one or more outputs of the AI model(s) (e.g., the global security breach model(s) or the local security breach model(s)), that have a level of confidence that satisfies a confidence criterion (e.g., exceed a threshold level of confidence, is larger than levels of confidence for other security actions, etc.). The platform can perform a set of operations to initiate the identified security action at the cloud-based environment. In some embodiments, the set of operations can include forwarding a security alert indicating the security breach to an analyst (e.g., a second-tier analyst, a third-tier analyst) that is capable/specialized in actions to address the security alert. In other or similar embodiments, the set of operations can include one or more operations of a security protocol. The platform can execute the set of operations to perform the security action (e.g., without forwarding the security breach to an analyst).

Aspects and embodiments of the present disclosure enable detection and mitigation of security breaches in a cloud-based environment using AI techniques. As described above, embodiments of the present disclosure provide global security threat and local security threat AI models that are trained to predict client device activities that are indicative of security breaches in a cloud-based environment and/or security actions to be performed to mitigate the security breaches. A platform can accordingly identify activities that are indicative of legitimate security breaches and filter security activities corresponding to "noisy alerts" based on the outputs of the AI model(s). Thus, the platform can identify activities that correspond to legitimate security or violations in a shorter amount of time, which reduces the amount of computing resources consumed in the cloud-based environment (e.g., which improves an overall efficiency and decreases an overall latency of the system) and minimizes the amount of time that resources of the cloud-based environment are exposed to security threats. Further, the platform can identify security actions that are to be taken to mitigate the security breach, based on outputs of the AI model(s). In some embodiments, this can reduce the amount of time spent identifying an appropriate analyst that is capable/specialized in actions that address the security alert, which can further reduce the amount of computing resources consumed and/or minimize the amount of time that the resources exposed to security threats. In additional or alternative embodiments, the platform can perform a security action to mitigate the security breach (e.g., without forwarding an alert to an analyst), which can enable the platform to handle the security breach, which can even further reduce the amount of time that resources are exposed to security threats.

FIG. 1 illustrates an example system architecture 100, in accordance with implementations of the present disclosure. The system architecture 100 (also referred to as "system" herein) includes client devices 102A-N (collectively and individually referred to as client device 102 herein), a data store 110, a platform 120, server machine 150, and/or a predictive system 180 each connected to a network 104. In implementations, network 104 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some embodiments, system 100 can be or otherwise include a cloud-based computing environment (also referred to as a "cloud-based environment" herein).

In some implementations, data store 110 is a persistent storage that is capable of storing data as well as data structures to tag, organize, and index the data. Data store 110 can be hosted by one or more storage devices, such as main memory, magnetic or optical storage based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by platform 120 or one or more different machines coupled to the platform 120 via network 104.

Platform 120 can be configured to monitor activity of one or more client devices of system 100 and detect whether a security breach has occurred based on the monitored activity. In some embodiments, platform 120 can additionally or alternatively determine one or more security actions to be performed in response to the security breach. A client device refers to a device that communicates with other devices across a network (e.g., network 104). In some embodiments, client devices 102 can be or otherwise include an endpoint device. In other or similar embodiments, client devices 102 can be connected to one or more endpoint devices (e.g., via network 104). As illustrated in FIG. 1, platform 120 can include a security engine 152. Security engine 152 can be configured to detect a security breach and/or perform one or more security actions to address the security breach, in accordance with embodiments described herein.

In some embodiments, security engine 152 can detect a security breach and/or determine one or more security actions to address the security breach based on one or more outputs of an artificial intelligence (AI) model of or otherwise associated with predictive system 180. An AI model can include a generative AI model, a discriminative AI model, or any other type of AI model that can be trained to provide predictions. In some embodiments, one or more AI models can be trained to predict activities performed with respect to one or client devices 102 of system 100 that are indicative of a security breach and/or one or more security actions to mitigate the security breach. Such AI models are referred to herein as global security breach models herein, as such AI models can evaluate event data from multiple client devices 102 to identify a security threat (e.g., globally) within the cloud-based environment. Further details regarding the global security breach model are provided with respect to FIG. 3 below. In additional or alternative embodiments, one or more AI models can be trained to predict current activities performed by a particular client device 102 of system 100 that deviate from historical activities performed by the particular client device 102 and/or one or more security actions to mitigate the security breach. Such AI models are referred to herein as local security breach models herein, as such AI models can evaluate event data from a particular client device 102 to determine whether a current activity of the client device deviates from a historical endpoint activity of the device. Further details regarding the local security breach model are provided with respect to FIG. 4 below.

In some embodiments, predictive system 180 can train the global security breach model(s) and/or the local security breach model(s) based on historical security event data collected for client devices 102 of system 100 (or other cloud-based environments) and/or historical security action data indicating one or more security actions performed to mitigate security risks. In an illustrative example, predictive system 180 can train a global security breach model based on training data that includes a mapping between a training input and a target output, the training input including historical event data indicating one or more historical activities performed with respect to one or more client devices 102 of system 100, and the target output indicating whether the historical activities were previously indicated (e.g., by a security authority) to be indicative of a historical security breach and, if so, one or more historical security actions initiated to mitigate the historical security breach. In another illustrative example, predictive system 180 can train a local security breach model based on training data that includes a mapping between first historical event data indicating one or more first historical activities performed by a particular client device 102, second historical event data indicating one or more second historical activities performed by another client device 102 that were indicated (e.g., by a security authority) to be indicative of a historical security breach, and an indication of one or more historical security actions initiated to mitigate the historical security breach. Further details regarding predictive system 180 and training the global security breach model(s) and the local security breach model(s) are provided with respect to FIGS. 5-7 below.

Security engine 152 (e.g., residing at platform 120 and/or server machine 150) can feed event data obtained from one or more client devices as input to global security breach model(s) and/or the local security breach model(s) and can determine whether a security breach has occurred and/or an action to mitigate the security breach based on one or more outputs of the model(s), as described herein. Further details regarding determining whether a security breach has occurred and/or an action to mitigate the security breach are provided herein with respect to FIGS. 2-4.

It should be noted that although FIG. 1 illustrates security engine 152 as part of platform 120, in additional or alternative embodiments, security engine 152 can reside on one or more server machines that are remote from platform 120. For example, security engine 152 can reside at server machine 150. In other or similar embodiments, security engine 152 can reside on one or more client devices 102. For example, security engine 152 can reside at a client device 102N, as illustrated in FIG. 1. Further, although FIG. 1 illustrates predictive system 180 as remote from platform 120, in additional or alternative embodiments, predictive system 180 can reside on platform 120, server machine(s) 150, client device 102, and/or any other component of system 100. It should be noted that in some other implementations, the functions of platform 120, server machine 150, and/or predictive system(s) 180 can be provided by more or a fewer number of machines. For example, in some implementations, components and/or modules of platform 120, server machine 150, and/or predictive system(s) 180 may be integrated into a single machine, while in other implementations components and/or modules of any of platform 120, server machine 150, and/or predictive system(s) 180 may be integrated into multiple machines. In addition, in some implementations, components and/or modules of server machine 150, and/or predictive system(s) 180 into platform 120.

In general, functions described in implementations as being performed platform 120, server machine 150, and/or predictive system(s) 180 can also be performed on the client device 102 in other implementations. In addition, the functionality attributed to a particular component can be performed by different or multiple components operating together. Platform 120 can also be accessed as a service provided to other systems or devices through appropriate application programming interfaces, and thus is not limited to use in websites.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2:
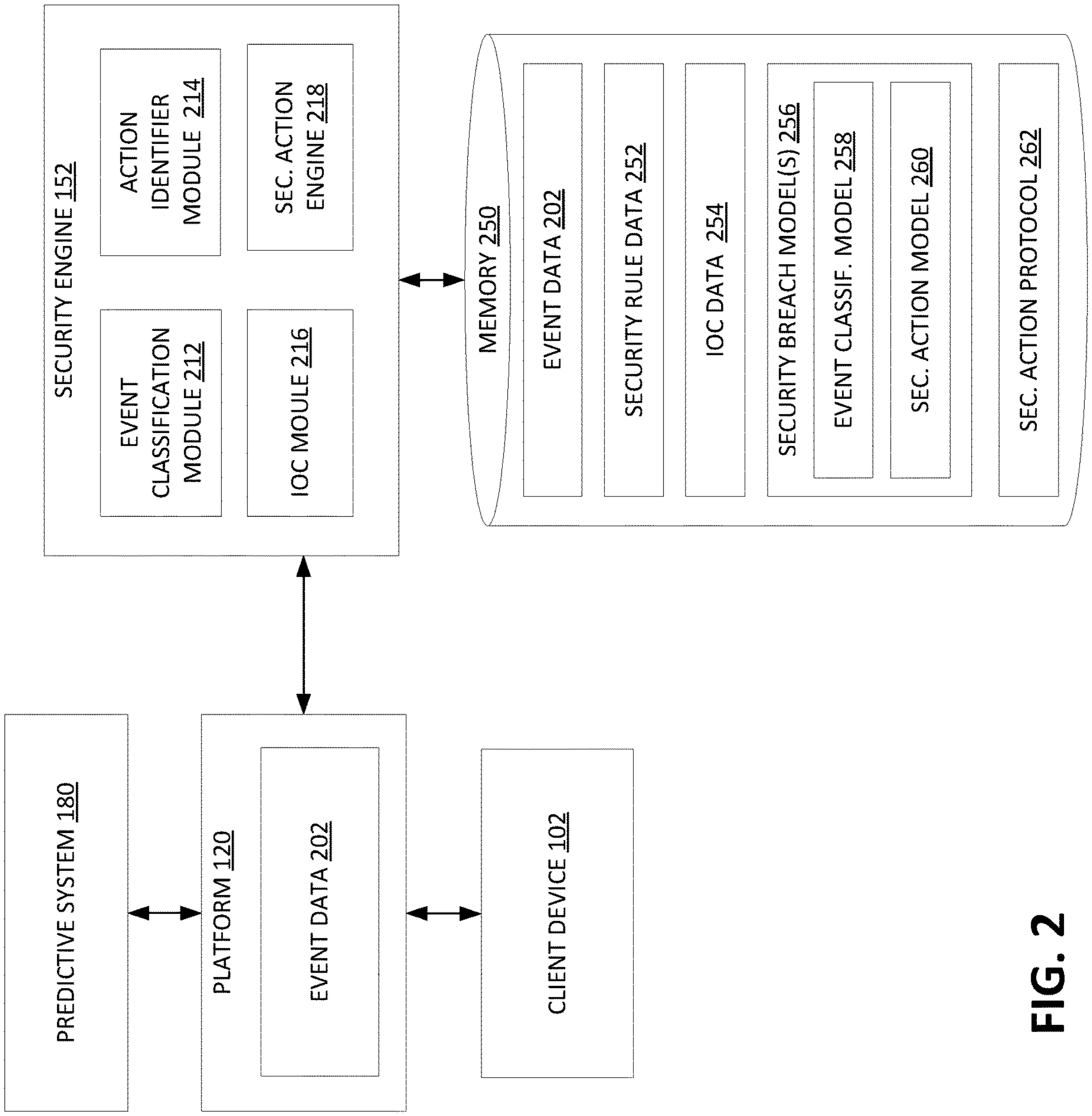
FIG. 2 is a block diagram that includes an example platform and an example security engine, in accordance with implementations of the present disclosure.

FIG. 2 is a block diagram that includes an example platform 120 and an example security engine 152, in accordance with implementations of the present disclosure. As described above, security engine 152 can reside at or can otherwise be connected to platform 120 (e.g., using network 104). In some embodiments, platform 120 and/or security engine 152 can be connected to memory 250. Memory 250 can correspond to one or more portions of data store 110, in some embodiments. In additional or alternative embodiments, memory 250 can correspond to any memory of, connected to, or accessible by a component of system 100.

As described above, security engine 152 can detect a security breach and/or determine one or more security actions to address the security breach based on event data obtained from one or more client devices 102 of system 100. As illustrated in FIG. 2, security engine 152 can include an event classification module 212, an action identifier module 214, an indicator of compromise (IOC) module 216, and/or a security action engine 218. Embodiments pertaining to security engine 152 are described, at least, with respect to FIGS. 3-4 below.

Figure 3:
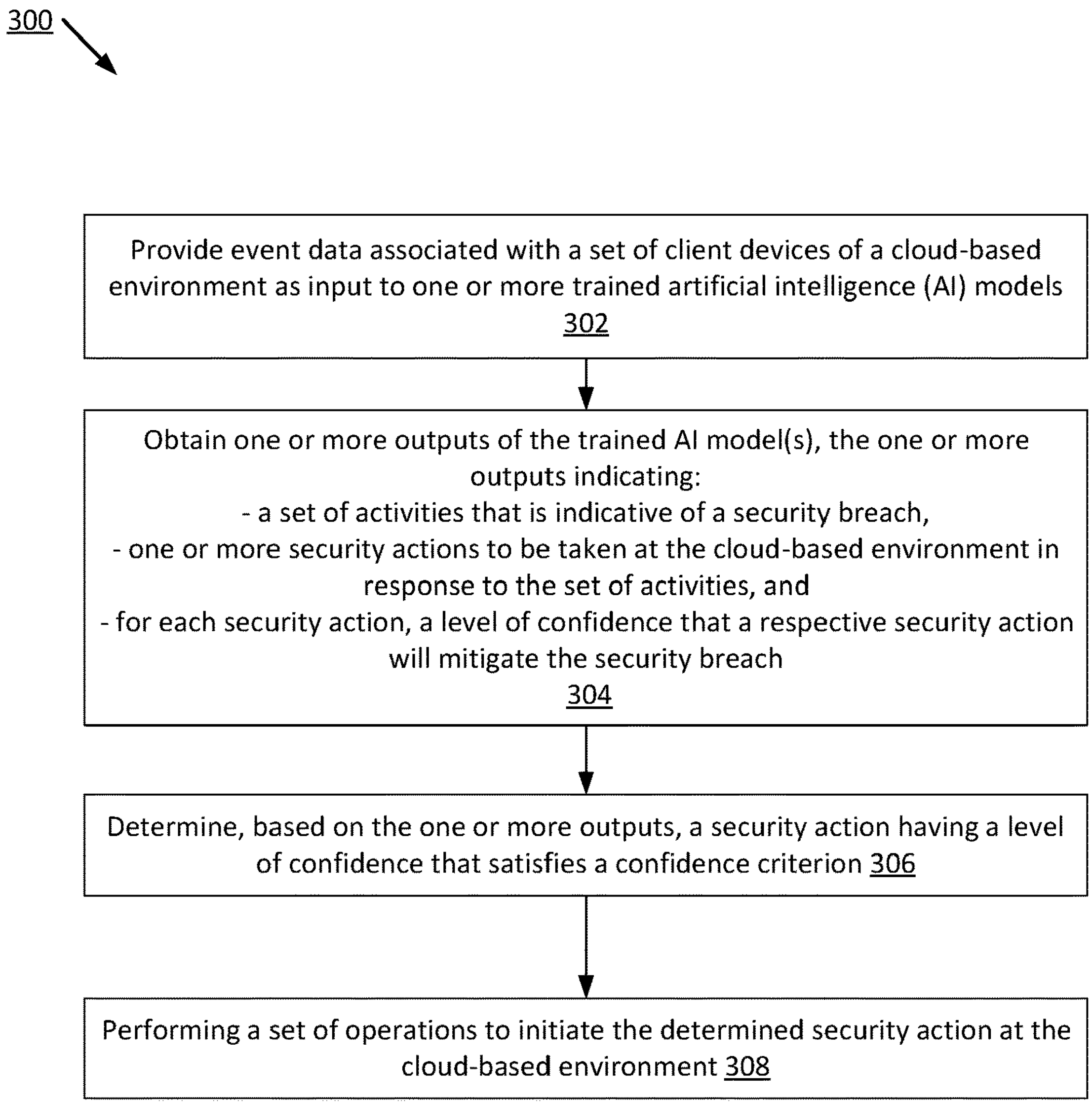
FIG. 3 depicts a flow diagram of an example method for security breach detection and mitigation, in accordance with implementations of the present disclosure.
Figure 4:
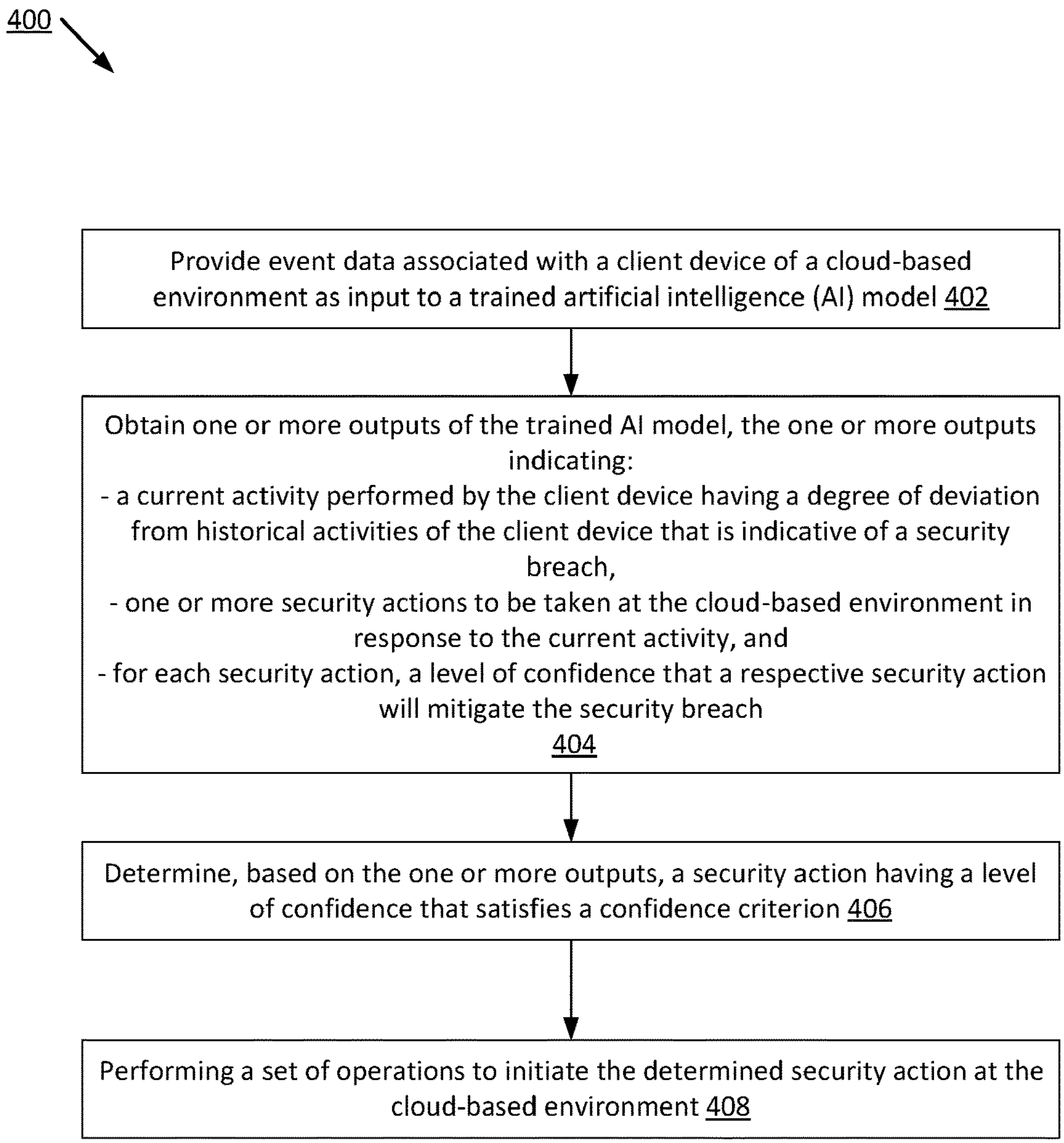
FIG. 4 depicts a flow diagram of another example method for security breach detection and mitigation, in accordance with implementations of the present disclosure.

FIGS. 3 and 4 depict flow diagrams of example methods 300 and 400 for security breach detection and mitigation, in accordance with implementations of the present disclosure. Methods 300 and/or 400 can be performed by processing logic that can include hardware (circuitry, dedicated logic, etc.), software (e.g., instructions run on a processing device), or a combination thereof. In one implementation, some or all of the operations of methods 300 and/or 400 can be performed by one or more components of system 100 of FIG. 1. In some embodiments, some or all of the operations of methods 300 and/or 400 can be performed by security engine 152, as described above.

Referring now to FIG. 3, at block 302, processing logic provides event data associated with a set of client devices of a cloud-based environment as input to one or more trained artificial intelligence (AI) models. The event data indicates activities performed with respect to the set of client devices. In some embodiments, one or more client devices 102 can transmit event data 202 to platform 120 (e.g., during operation of client devices 102). The event data 202 can indicate one or more activities performed by a respective client device 102 and/or performed with respect to the client device 102. In some embodiments, the event data 202 can indicate processing activities (e.g., a type or frequency of operations performed at or with respect to a client device), data access activities (e.g., a type or frequency of data accessed by the client device, transmitted by the client device 102, and/or transmitted from the client device 102), network-based activities (e.g., entities that transmit or receive data from the client device, a frequency of transmission to such entities), and so forth.

In some embodiments, security engine 152 can transmit a set of instructions to a client device 102 that, when executed, cause the client device 102 to generate a log indicating one or more activities performed with respect to the client device 102. Security engine 152 can transmit the set of instructions to client device 102 during an initialization process associated with system 100, in some embodiments. Client device 102 can generate the log according to a schedule or protocol indicated by the set of instructions and can transmit the generated log as event data 202.

In some embodiments, multiple client devices 102 can be associated with a common user (e.g., an enterprise user). For example, multiple client devices 102 can be associated with a common organization or entity. An administrator of the organization or entity can enroll each of the multiple client devices 102 for security monitoring by security engine 152 and/or platform 120. In some embodiments, security engine 152 can transmit the set of instructions to each of the multiple client devices 102 (e.g., during an initialization process). Accordingly, each of the multiple client devices 102 can transmit event data 202 to platform 120, as described herein. In some embodiments, platform 120 can receive multiple sets of event data 202 each transmitted by a respective client device 102 associated with the organization or entity in a time period.

Upon receiving the event data 202 from client devices 102, security engine 152 can feed the event data 202 as input to one or more security breach models 256. As described above, the event data 202 can indicate activities by each of multiple client devices 102 (e.g., associated with a common organization or entity). In some embodiments, security breach models 256 can be trained to predict whether an activity of event data 202 is indicative of a security breach and, if so, one or more security actions that will mitigate the security breach. A security action can include, but is not limited to, preventing one or more client devices of the cloud-based environment from performing one or more operations (e.g., for a particular time period), preventing the one or more client devices from accessing a particular type of data, preventing the one or more client devices from communicating with a particular entity, and so forth.

In some embodiments, the security breach model(s) 256 can include one or more global security models that are trained to evaluate event data from multiple client devices to identify a security threat (e.g. globally) within the cloud-based environment. It should be noted that a global security breach or threat, as used herein, refers to a security breach or threat that occurs across one or more client devices 102 of a cloud-based environment. A local security breach or threat, as used herein, refers to a security breach or threat that occurs at a particular client device 102 of the cloud-based environment. In some embodiments, the global security breach model(s) can be trained (e.g., by predictive system 180) based on historical event data 202 collected from one or more client devices 102 of system 100 (and/or another cloud-based environment), security rule data 252 associated with platform 120 and/or an organization or entity accessing services or resources of platform 120, and/or indicator of compromise data 254.

Security rule data 252 can include one or more security rules defined by platform 120 and/or an organization or entity associated with platform 120 associated with identifying a security breach or violation. In an illustrative example, a security rule can identify one or more malicious actors and can provide that any communication with a device associated with the malicious actors is indicative of a security breach. In another illustrative example, a security rule can provide that an increased frequency of communication between a client device 102 and an entity (e.g., that the client device 102 has not previously communicated with) at a particular time of day is indicative of a security breach. In another or similar example, the security rules of security rule data 252 can indicate one or more activities and, for each activity, a score or a rating indicating a degree of risk associated with the activities. In some embodiments, platform 120 can define the security rules of security rule data 252 (e.g., based on historical or experimental activity of client devices 102 of a cloud-based environment). In other or similar embodiments, an organization or entity that is accessing the services or resources of platform 120 can provide security rule data 252 (e.g., via a client device 102 or other such device associated with the organization or the entity).

Indicator of compromise (IOC) data 254 can include data that indicates one or more activities pertaining to one or more other security breaches of other cloud-based environments. In some embodiments, platform 120 can provide security monitoring and mitigation services or resources to client devices 102 associated with multiple entities or organizations. Platform 120 can define one or more IOCs based on the activities of the client devices 102 that are determined to be related to or correspond to a security breach. Examples of IOCs include, but are not limited to, unusual outbound traffic of a client device 102, geographic irregularities associated with a client device 102 (e.g., login attempts from countries with which your organization does not typically do business), increased database activity, suspicious configuration changes, user account anomalies (e.g., unusual activity associated with an account of a user associated with a client device 102), excessive requests on files or data designated as important or sensitive to an organization or entity, high authentication failures by the client device 102, unusually large HyperText Markup Language (HTML) sizes from the client device 102, unexpected processes executed by the client device 102, activities by the client device 102 corresponding to a known distributed denial of service (DDoS) attack, unexpected or unauthorized changes in a security rating associated with a client device 102, communication with known malicious actors by the client device 102, excessive privilege escalation, and so forth.

Further details regarding training global security breach model(s) 256 based on the event data 202, the security rule data 252, and the IOC data 254 are provided with respect to FIGS. 5 and 6 below.

In some embodiments, security breach models 256 can include or otherwise correspond to multiple AI models that are each trained to perform different tasks associated with security engine 152. For example, as illustrated in FIG. 2, security breach models 256 can include or can otherwise correspond to an event classifier module 212 and/or a security action model 260. Event classifier module 212 can be trained to classify one or more events or activities of event data 202 based on whether such events or activities are indicative of a security breach. In some embodiments, one or more outputs of classifier module 212 can indicate one or more events or activities of event data 202 that are indicative of a security breach and/or one or more events or activities of event data 202 that are not indicative of a security breach. In other or similar embodiments, classifier module 212 can indicate a security rating or score for each activity of event data 202, where a value of the security rating or score indicates a security threat level associated with a respective activity. For example, an activity having a high security rating or score can have a high security threat level while an activity with a low security rating or score can have a low security threat level.

As indicated above, security breach models 256 can include or can otherwise correspond to a security action model 260. Security action model 260 can be trained to predict a security action that is to mitigate a security breach indicated by an event or activity (e.g., identified or classified by event classifier model 258). In some embodiments, one or more outputs of event classifier model 258 can be fed as an input to security action model 260, as described herein. One or more outputs of security action model 260 can include one or more security actions and, for each security action, a level of confidence that the security action will mitigate the security breach indicated by an activity.

In additional or alternative embodiments, a security breach model 256 can include or otherwise correspond to a single AI model that is trained to perform both detect security threats and predict a security action that will mitigate a detected security threat, as described herein. For example, event data 202 can be fed as an input to a security breach model 256, as described herein. One or more outputs of the security breach model 256 can indicate a set of activities of the event data 202 that are indicative of a security breach, one or more security actions to be taken in response to the set of activities, and/or, for each security action, a level of confidence that a respective security action will mitigate the security breach. It should be noted that some embodiments described herein involve event data 202 being fed as input to event classifier model 258 and one or more outputs of event classifier model 258 are fed as input to security action model 260, such embodiments can be applied when event data 202 is fed into a single security breach model 256, as described above. Similarly, although some embodiments involve event data 202 being fed as input to a single security breach model 256, such embodiments can be applied when event data 202 is fed as input to event classifier model 258 and one or more outputs of event classifier model 258 are fed as input to security action model 260.

In some embodiments, IOC module 216 can feed IOC data 254 as input to the one or more security breach models 256 (e.g., with event data 202). As described herein, IOC data 254 may be continuously updated based on detected activities indicative of security breaches.

Referring back to FIG. 3, at block 304, processing logic obtains one or more outputs of the trained AI model. The one or more outputs can indicate a set of activities, of the activities indicated by the event data, performed with respect to at least one of the set of client devices that is indicative of a security breach, one or more security actions to be taken at the cloud-based environment in response to the set of activities, and/or, for each of the security actions, a level of confidence that a respective security action will mitigate the security breach.

As described above, security engine 152 can feed event data 202 as input to one or more security breach models 256 and can obtain one or more outputs of the one or more security breach models 256. In some embodiments, event classification module 212 can provide the event data 202 as input to event classifier model 258 and can obtain one or more outputs of event classifier model 258. The one or more outputs can indicate one or more activities of event data 202 that are indicative of a security breach, in some embodiments. In some embodiments, the one or more outputs can include an indication of one or more activities that are indicative of a security breach. In other or similar embodiments, the one or more outputs can include a security rating or score indicating a threat level associated with each activity of event data 202. In such embodiments, event classification module 212 can identify one or more activities that indicate a security breach by determining which activities have a security rating or score that satisfy one or more criteria (e.g., exceed a threshold security rating or score.

In some embodiments, action identifier module 214 can provide the activities identified based on the output(s) of event classifier model 258 as input to security action model 260 and can obtain one or more outputs. As described above, the one or more outputs of security action model 260 can indicate one or more security actions and, for each security action, a level of confidence that the security action will mitigate the security breach.

In additional or alternative embodiments, event classification module 212 and/or action identifier module 214 (and/or another component or module of security engine 152) can provide event data 202 as input to (e.g., a single) security breach model 256 and can obtain one or more outputs of the security breach model 256, as described above. In such embodiments, event classification module 212 can identify one or more activities of event data 202 that are indicative of a security breach based on the one or more outputs of security breach model 256. For example, event classification module 212 can identify the activities indicated by the one or more outputs to be a security breach and/or the activities associated with a security score or rating that satisfies one or more criteria. In some embodiments, event classification module 212 can store an indication of the identified activities at memory 250, for use by IOC module 216 to update IOC data 254 associated with the cloud-based environment, as described herein.

Referring back to FIG. 3, at block 306, processing logic determines, based on the one or more outputs, a security action having a level of confidence that satisfies a confidence criterion. Action identifier module 214 can obtain one or more outputs of a security breach model 256 and/or security action model 260 that indicate one or more security actions to be taken with respect to the activities that are indicative of a security breach and, for each security action, a level of confidence that the security action will mitigate the security breach, as descried above. In some embodiments, action identifier module 214 can identify a security action having a level of confidence that satisfies a confidence criterion by determining a security action having a level of confidence that exceeds a threshold level of confidence (e.g., defined by a developer or operator of platform 120, determined based on experimental or historical data associated with system 100, etc.). In additional or alternative embodiments, action identifier module 214 can identify a security action having a level of confidence that satisfies a confidence criterion by determining a security action having a level of confidence that is larger than levels of confidence for other security actions of the one or more outputs.

At block 308, processing logic performs a set of operations to initiate the determined security action at the cloud-based environment. In some embodiments, security action engine 218 can identify a security action protocol 262 associated with the determined security action. The security action protocol 262 can indicate a set of operations that are to be performed in accordance with the security action. In some embodiments, the set of operations can include a series of operations or actions that can be performed by security action engine 218 in order to mitigate the security breach. For example, the set of operations can include an operation associated with executing one or more instructions to prevent at least one or more client devices 102 from performing one or more operations for a particular time period, executing one or more instructions to prevent one or more client devices 102 from accessing a particular type of data, executing one or more instructions to prevent at one or more client devices 102 from communicating other client devices (e.g., of system 100 or of another cloud-based environment), and so forth. In some embodiments, the set of operations can pertain to the client device 102 that performed the activity indicative of the security breach. In other or similar embodiments, the set of operations can pertain to other client devices 102 or other components of system 100 (or of another cloud-based environment) that may be impacted by the security breach. In other or similar embodiments, the set of operations can include an instruction to transmit a security alert to a computing system associated with a security authority associated with the determined security action. Security action engine 218 can transmit the security alert to the computing system associated with the security authority indicated by the security action protocol 262, in some embodiments.

In some embodiments, the security action protocol 262 can include or otherwise indicate one or more security actions and, for each security action, a threshold level of confidence (as indicated by output(s) of security breach model(s) 256) for which security action engine 218 can perform operations of the security action without transmitting an alert to a security authority. Upon determining that the level of confidence associated with the security action (e.g., as indicated by the output(s) of security breach model(s) 256) meet or exceed the threshold level of confidence for the security action indicated by the security action protocol 262, security action engine 218 can perform the one or more operations associated with the security action. Upon determining that the level of confidence associated with the security action falls below the threshold level of confidence, security action engine 218 can transmit an alert to a security authority associated with the determined security action (e.g., as indicated by the security action protocol).

As described above, in some embodiments IOC module 216 can update IOC data 254 based on the identified activities of event data 202 that are indicative of a security breach. In some embodiments, IOC module 216 can maintain or otherwise access a data store that stores data indicating activities corresponding to a security breach. The data store can include data obtained based on activities of client devices 102 of system 100 and/or other systems associated with platform 120. In some embodiments, IOC module 216 can determine that a number of data items stored at the data store that pertain to the indicated activity exceeds a threshold number. In such embodiments, IOC module 216 can classify such activity as an indicator of compromise and can update IOC data 254 to include such activity.

In some embodiments, IOC module 216 can feed IOC data 254 as input to the one or more security breach models

256 (e.g., with event data 202). As described herein, IOC data 254 may be continuously updated based on detected activities indicative of security breaches. IOC module 216 can feed IOC data 254 (e.g., as IOC data 254 is updated) as input to security breach model(s) 256. In some embodiments, security breach model(s) 256 can predict whether an activity of event data 202 is indicative of a security breach (e.g., based on a correspondence or similarity between the activity and activities of IOC data 254).

As described above, FIG. 4 depicts a flow diagram of another example method 400 for security breach detection and mitigation, in accordance with implementations of the present disclosure. Referring now to FIG. 4, at block 402, processing logic provides event data associated with a client device of a cloud-based environment as input to a trained AI model. The event data can indicate one or more current activities performed by the client device. In contrast to embodiments described with respect to FIG. 3, security engine 152 can receive event data 202 associated with a single client device 102 (e.g., instead of multiple client devices 102), in some embodiments. In other or similar embodiments, security engine 152 can receive event data 202 associated with multiple client devices 102 that are each associated with a common user. For example, security engine 152 can receive event data 202 from a mobile device, a laptop device, a wearable device, etc., each associated with the same user. Client device 102 can generate or otherwise obtain event data 202 in accordance with previously described embodiments.

Security engine 152 can feed event data 202 as input to one or more security breach models 256, as described above. In some embodiments, the security breach model(s) can be local security breach models that are trained to evaluate event data from a single client device 102 (or from multiple client devices associated with a common user) to identify a security threat (e.g., locally). In an illustrative example, a security threat can be identified if a current activity of the client device 102 deviates from a historical activity of the client device 102.

In accordance with previously described embodiments, local security breach models 256 can include or otherwise correspond to an event classifier model 258 and/or a security action model 260. Event classifier model 258 can be trained to predict one or more current activities of a client device 102 (e.g., indicated by event data 202) that has a degree of deviation from historical activity of client device 102 such to correspond to a security threat. Security action model 260 can be trained to predict a security action that will mitigate a security threat or breach of a predicted current activity as described herein. In other or similar embodiments, a local security breach model can include or otherwise correspond to a single AI model that is trained to predict a current activity that deviates from a historical activity of a client device 102 such to indicate a security breach or threat and a security action that will mitigate the security breach or threat.

At block 404, processing logic obtains one or more outputs of the trained AI model. The one or more outputs indicate a current activity performed by the client device having a degree of deviation from historical activities performed by the client device that is indicative of a security breach, one or more security actions to be taken at the cloud-based environment in response to the current activity, and/or, for each of the one or more security actions, a level of confidence that a respective security action will mitigate the security breach.

As described above, security engine 152 can feed event data 202 as input to one or more local security breach models 256 and can obtain one or more outputs of the one or more security breach models 256. In some embodiments, event classification module 212 can provide the event data 202 as input to event classifier model 258 and can obtain one or more outputs of event classifier model 258. The one or more outputs can indicate one or more activities of event data 202 that have a degree of deviation from historical activities performed by the client device 102 that are indicative of a security breach, in some embodiments. In some embodiments, the one or more outputs can include an indication of one or more current activities that are indicative of a security breach. In other or similar embodiments, the one or more outputs can include a security rating or score indicating a threat level associated with each current activity of event data 202. In such embodiments, event classification module 212 can identify one or more current activities that indicate a security breach by determining which activities have a security rating or score that satisfy one or more criteria (e.g., exceed a threshold security rating or score).

In some embodiments, action identifier module 214 can provide the activities identified based on the output(s) of event classifier model 258 as input to security action model 260 and can obtain one or more outputs. As described above, the one or more outputs of security action model 260 can indicate one or more security actions and, for each security action, a level of confidence that the security action will mitigate the security breach, as described herein.

In additional or alternative embodiments, event classification module 212 and/or action identifier module 214 (and/or another component or module of security engine 152) can provide event data 202 as input to (e.g., a single) local security breach model 256 and can obtain one or more outputs of the security breach model 256, as described above. In such embodiments, event classification module 212 can identify one or more current activities of event data 202 that have a degree of deviation from historical activities so to indicate a security breach based on the one or more outputs of security breach model 256. For example, event classification module 212 can identify the current activities indicated by the one or more outputs to be a security breach and/or the activities associated with a security score or rating that satisfies one or more criteria. In some embodiments, event classification module 212 can store an indication of the identified activities at memory 250, for use by IOC module 216 to update IOC data 254 associated with the cloud-based environment, as described herein.

At block 406, processing logic determines, based on the one or more outputs, a security action having a level of confidence that satisfies a confidence criterion. Action identifier module 214 can determine the security action having the level of confidence that satisfies the confidence criterion as described herein (e.g., with respect to block 306 of FIG. 3). At block 408, processing logic performs a set of operations to initiate the determined security action at the cloud-based environment. Security action engine 218 can perform the set of operations in accordance with previously described embodiments (e.g., with respect to block 308 of FIG. 3). In some embodiments, IOC module 216 can update the IOC data 254 based on the identified current activities of client device 102 that are indicative of the security breach, as described above. IOC module 216 can feed IOC data 254 as input to local security breach model 256, as described herein.

Figure 5:
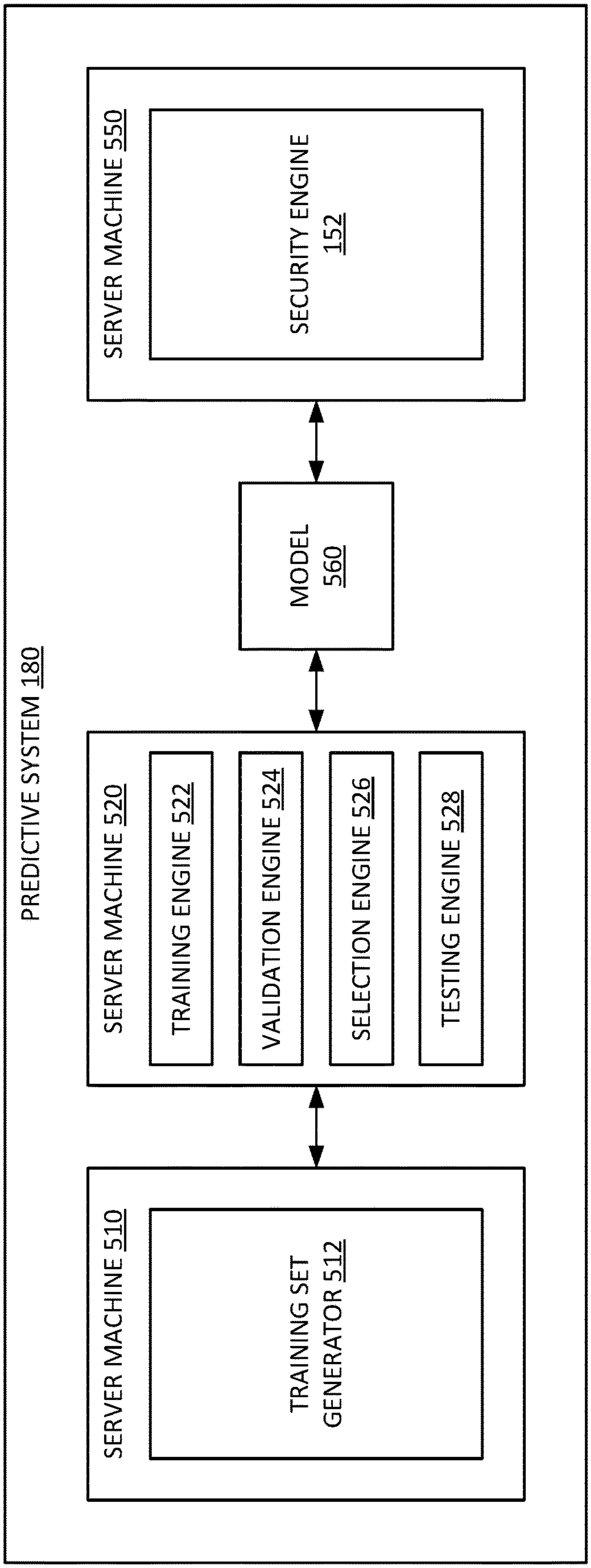
FIG. 5 illustrates an example predictive system, in accordance with implementations of the present disclosure.

FIG. 5 illustrates an example predictive system 180, in accordance with implementations of the present disclosure.

In some embodiments, predictive system 180 can be configured to train one or more AI models 560 associated with security engine 152. For example, predictive system 180 can be configured to train one or more global security breach models 256 (e.g., event classifier model 258, security action model 260, etc.) and/or one or more local security breach models 256 (e.g., event classifier model 258, security action model 260, etc.), described with respect to FIGS. 2-4.

As illustrated in FIG. 5, predictive system 180 can include a training set generator 512 (e.g., residing at server machine 510), a training engine 522, a validation engine 524, a selection engine 526, and/or a testing engine 528 (e.g., each residing at server machine 520), and/or a predictive component (e.g., residing at server machine 550). Training set generator 512 may be capable of generating training data (e.g., a set of training inputs and a set of target outputs) to train model 560. In some embodiments, the predictive component residing at server machine 550 can be or otherwise include security engine 151.

As mentioned above, training set generator 512 can generate training data for training model 560. Training set generator 512 obtain training data for training model 560 and can organize or otherwise group the training data for training model 560 (e.g., according to the purpose of the model).

Figure 6:
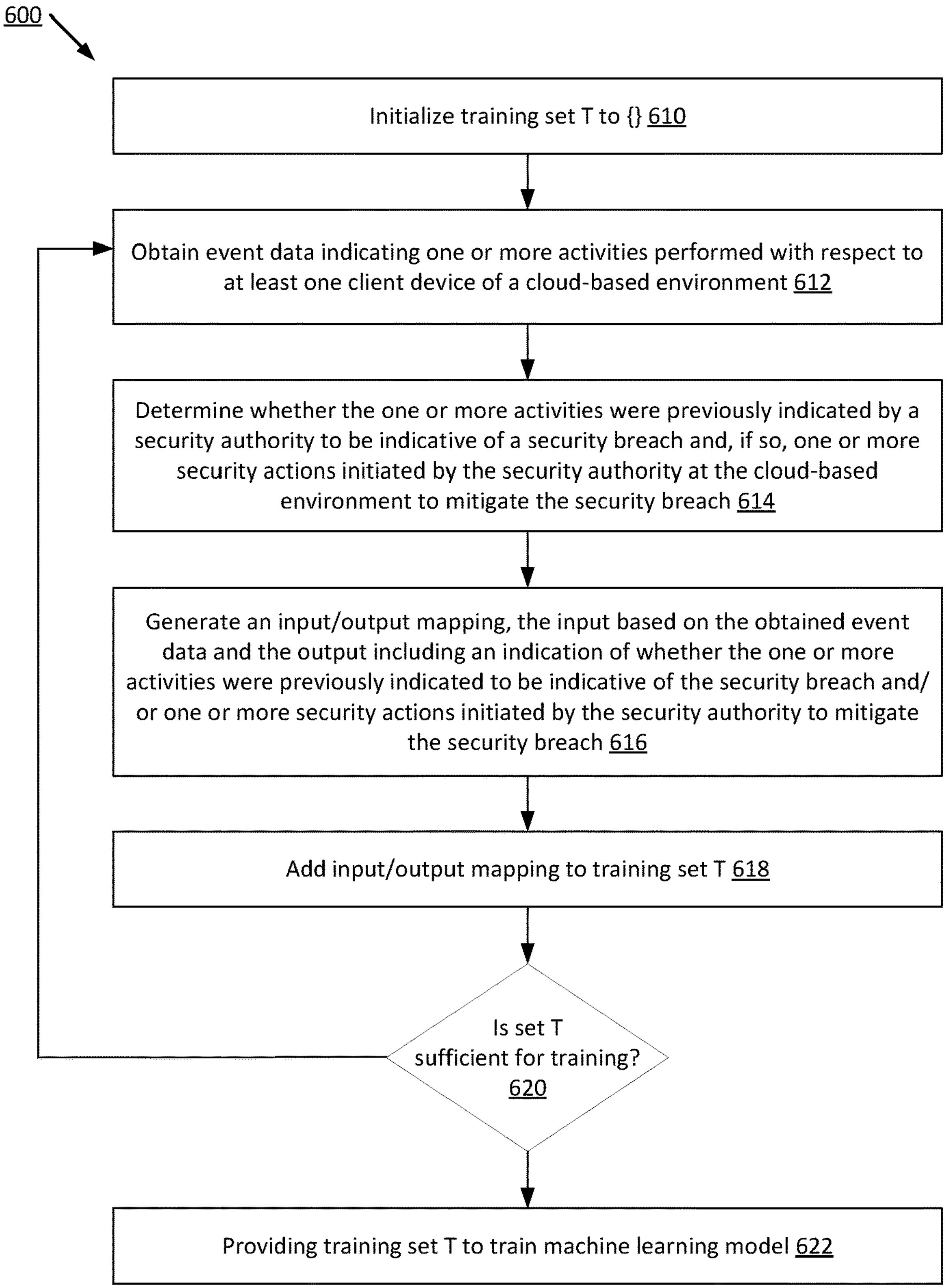
FIG. 6 depicts a flow diagram of a method for training a AI model, in accordance with implementations of the present disclosure.
Figure 7:
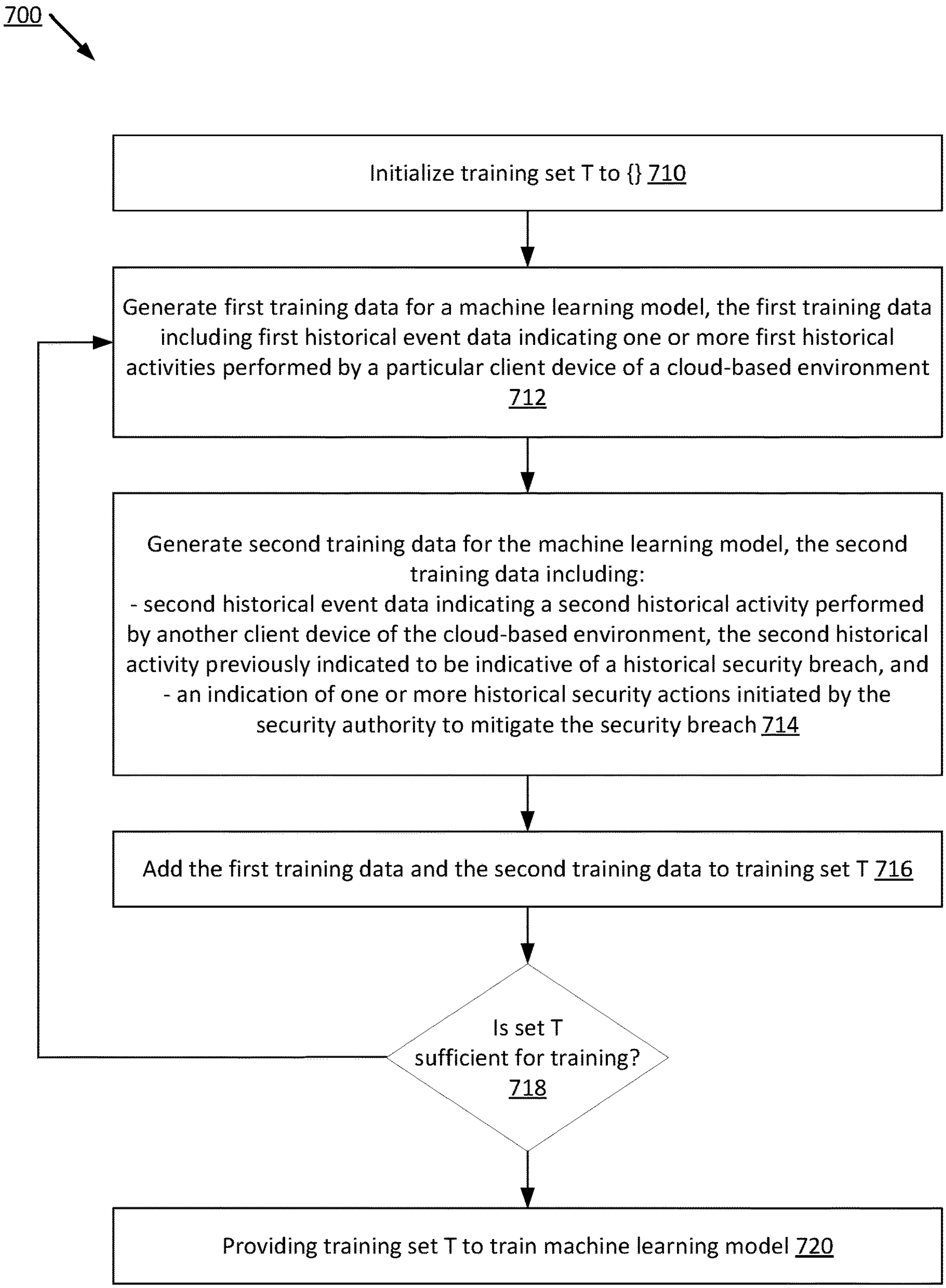
FIG. 7 depicts a flow diagram of another method for training an AI model, in accordance with implementations of the present disclosure.

FIG. 6 depicts a flow diagram of a method 600 for training an AI model (e.g., a global security breach model 256), in accordance with implementations of the present disclosure. FIG. 7 depicts a flow diagram of another method 700 for training a machine learning model (e.g., a local security breach model 256), in accordance with implementations of the present disclosure. Methods 600 and/or 700 can be performed by processing logic that can include hardware (circuitry, dedicated logic, etc.), software (e.g., instructions run on a processing device), or a combination thereof. In one implementation, some or all of the operations of methods 600 and/or 700 can be performed by one or more components of system 100 of FIG. 1. In some embodiments, some or all of the operations of methods 600 and/or 700 can be performed by predictive system 180, specifically by training set generator 512 of predictive system 180.

Referring now to FIG. 6, at block 610, processing logic initializes training set T to null (e.g., { }). At block 612, processing logic obtains event data indicating one or more activities performed with respect to at least one client device of a cloud-based environment. In some embodiments, the event data can correspond to event data 202 described above. The event data 202 can indicate one or more activities performed by a respective client device 102 and/or performed with respect to the client device 102. In some embodiments, the event data 202 can indicate processing activities (e.g., a type or frequency of operations performed at or with respect to a client device), data access activities (e.g., a type or frequency of data accessed by the client device, transmitted by the client device 102, and/or transmitted from the client device 102), network-based activities (e.g., entities that transmit or receive data from the client device, a frequency of transmission to such entities), and so forth.

At block 614, processing logic determines whether the one or more activities were previously indicated by a security authority to be indicative of a security breach and, if so, one or more security actions initiated by the security authority at the cloud-based environment to mitigate the security breach. The security actions can include, but are not limited to, preventing one or more client devices of the cloud-based environment from performing one or more operations (e.g., for a particular time period), preventing the one or more client devices from accessing a particular type of data, preventing the one or more client devices from communicating with a particular entity, and so forth.

In some embodiments, one or more of the activities of event data 202 may have been involved or lead to a security breach of which a security authority (e.g., a security analyst) took a security action to address the security breach. Such activities and/or security actions may be indicated in security logs associated with the cloud-based environment and/or platform 120. Processing logic can identify the security logs (e.g., from memory 250 or from another memory associated with the cloud-based environment) and can determine one or more activities that prompted a security action by the security authority.

At block 616, processing logic generates an input/output mapping, the input based on the obtained event data and the output including an indication of whether the one or more activities were previously indicated to be indicative of a security breach and/or one or more security actions initiated by the security authority to mitigate the security breach.

At block 618, processing logic adds the input/output mapping to training set T. At block 620, processing logic determines whether training set T is sufficient for training. Processing logic can determine whether training set T is sufficient for training by determining whether a number of input/output mappings of training set T meets or exceeds a threshold number of mappings. Upon processing logic determining that training set T is insufficient for training, method 600 can return to block 612. Upon processing logic determining that training set T is sufficient for training, method 600 can proceed to block 622. At block 622, processing logic provides training set T to train the AI model (e.g., the global AI model 256). In some embodiments, processing logic can provide training set T to training engine 522 to train the AI model.

As described above, training set generator 512 can further train model 560 based on security rule data 252 associated with platform 120 and/or an organization or entity accessing services or resources of platform 120 and/or based on IOC data 254. In some embodiments, security rule data 252 can indicate one or more activities that are indicative of a security breach and, for each activity, one or more operations of a security action that are to be performed to mitigate the security breach. In accordance with previously described embodiments, training set generator 512 can generate an input/output mapping based on security rule data 252, an input indicating one or more activities of security rule data 252 and an output indicating one or more security actions (and/or operations of the security action) that are to be performed upon detecting the one or more activities (e.g., in accordance with the rules of security rule data 252). In additional or alternative embodiments, IOC data 254 can indicate one or more activities that are indicative of a security breach (e.g., as detected by security engine 152 and/or a security engine of another cloud-based environment). The IOC data 254 may, in some embodiments, indicate one or more security actions taken to mitigate the security beach of the indicated activities. Training set generator 512 can generate an input/output mapping based on IOC data 254, as described above.

As described above, a security breach model 256 can include or can otherwise correspond to multiple AI models that are each trained to perform different tasks pertaining to the security breach detection and mitigation functionalities of security engine 152. For example, a security breach model 256 can include or can otherwise correspond to an event classifier model 258 (trained to classify an activity as an activity indicative of a security breach or not indicative of a security breach) and/or a security action model 260 (trained to predict a security action that will mitigate the security breach). In some embodiments, training set generator 512 can generate separate training data sets to be used for training event classifier model 258 and security action model 260. For example, training set generator 512 can generate a training data set for training event classifier model 258 that includes an input/output mapping, the input indicating an activity performed by or with respect to a client device 102 (e.g., as indicated by event data 202) and the output indicating whether the activity was involved in or caused a security breach. In another example, training set generator 512 can generate a training data set for training a security action model 260 that includes an input/output mapping, the input indicating an activity that was involved in or caused a security breach and the output indicating an action initiated by a security authority to mitigate the security breach.

As indicated above, FIG. 7 depicts a flow diagram of a method 700 for training a local security breach model 256. A local security breach model 256 can be trained to detect whether a current activity of a client device 102 has a degree of deviation from historical activity of the client device 102 such to indicate a security breach. Referring now to FIG. 7, at block 710, processing logic initializes training set T to null (e.g., { }). At block 712, processing logic generates first training data for a AI model, the first training data including first historical event data indicating one or more first historical activities performed by a particular client device of a cloud-based environment. The first historical event data can correspond to event data 202 that is obtained from a client device 102, as described above.

At block 714, processing logic generates second training data for the AI model. The second training data includes second historical event data indicating a second historical activity performed by another client device of the cloud-based environment (or another cloud-based environment), the second historical activity previously indicated to be indicative of a historical security breach. The second training data can additionally or alternatively include an indication of one or more historical security actions initiated by the security authority to mitigate the security breach. The second historical activity and/or the one or more historical security actions can be determined based on one or more security logs associated with platform 120, as described above. In other or similar embodiments, the second historical activity and/or the one or more historical security actions can be determined based on security rule data 252 and/or IOC data 254, as described herein.

At block 716, processing logic adds the first training data and the second training data to training set T. In some embodiments, processing logic can generate a mapping between the first training data and the second training data and update training set T to include the generated mapping. At block 718, processing logic determines whether training set T is sufficient for training. Processing logic can determine whether training set T is sufficient for training by determining whether a number of input/output mappings of training set T meets or exceeds a threshold number of mappings. Upon processing logic determining that training set T is insufficient for training, method 700 can return to block 712. Upon processing logic determining that training set T is sufficient for training, method 700 can proceed to block 720. At block 720, processing logic provides training set T to train the AI model (e.g., the local AI model 256). In some embodiments, processing logic can provide training set T to training engine 522 to train the AI model.

Referring back to FIG. 5, training engine 522 can train a AI model 560 using the training data (e.g., training set T) from training set generator 512. The AI model 560 can refer to the model artifact that is created by the training engine 522 using the training data that includes training inputs and/or corresponding target outputs (correct answers for respective training inputs). The training engine 522 can find patterns in the training data that map the training input to the target output (the answer to be predicted), and provide the AI model 560 that captures these patterns. The AI model 560 can be composed of, e.g., a single level of linear or non-linear operations (e.g., a support vector machine (SVM or may be a deep network, i.e., a AI model that is composed of multiple levels of non-linear operations). An example of a deep network is a neural network with one or more hidden layers, and such a AI model may be trained by, for example, adjusting weights of a neural network in accordance with a backpropagation learning algorithm or the like. In one aspect, the training set is obtained by training set generator 512 hosted by server machine 510.

Validation engine 524 may be capable of validating a trained AI model 560 using a corresponding set of features of a validation set from training set generator 512. The validation engine 524 may determine an accuracy of each of the trained AI models 560 based on the corresponding sets of features of the validation set. The validation engine 524 may discard a trained AI model 560 that has an accuracy that does not meet a threshold accuracy. In some embodiments, the selection engine 526 may be capable of selecting a trained AI model 560 that has an accuracy that meets a threshold accuracy. In some embodiments, the selection engine 526 may be capable of selecting the trained AI model 560 that has the highest accuracy of the trained AI models 560.

The testing engine 528 may be capable of testing a trained AI model 560 using a corresponding set of features of a testing set from training set generator 512. For example, a first trained AI model 560 that was trained using a first set of features of the training set may be tested using the first set of features of the testing set. The testing engine 528 may determine a trained AI model 560 that has the highest accuracy of all of the trained AI models based on the testing sets.

Predictive component 552 of server machine 550 may be configured to feed data as input to model 560 and obtain one or more outputs. As described above, a predictive component residing at server machine 550 can include security engine 152. Security engine 152 can feed event data 202 as input to security breach model(s) 256, as described above, and obtain one or more outputs, which can indicate a set of activities that is indicative of a security breach, one or more security actions to be taken in response to the set of activities, and/or, for each security action, a level of confidence that a respective security action will mitigate the security breach, as described above.

Figure 8:
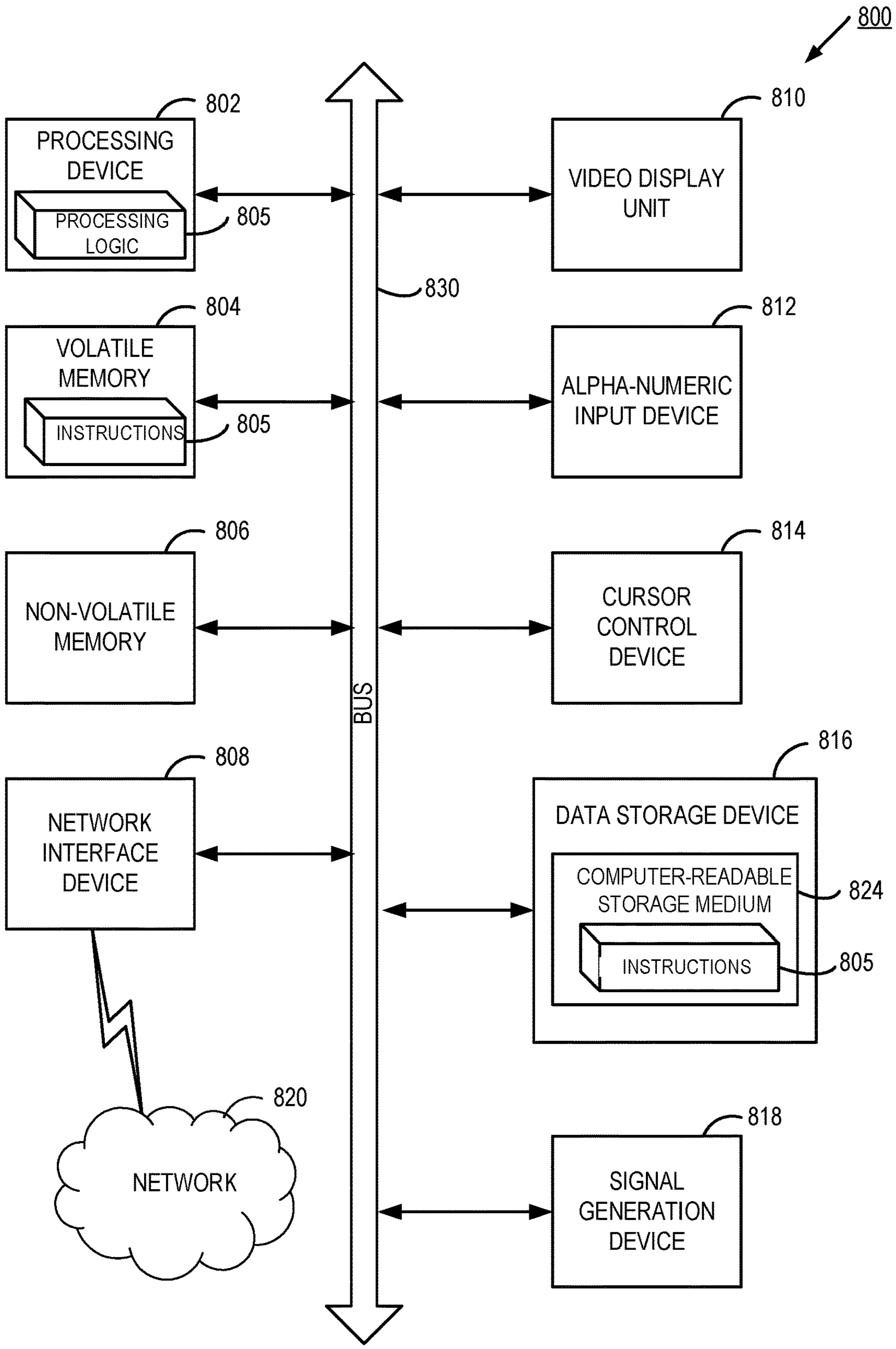
FIG. 8 is a block diagram illustrating an exemplary computer system, in accordance with implementations of the present disclosure.

FIG. 8 is a block diagram illustrating an exemplary computer system 800, in accordance with implementations of the present disclosure. The computer system 800 can correspond to platform 120 and/or client devices 102A-N, described with respect to FIG. 1. Computer system 800 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processing device (processor) 802, a main memory 804 (e.g., read-only memory (ROM), flash memory, dynamic random access memory (DRAM) such as synchronous DRAM (SDRAM), double data rate (DDR SDRAM), or DRAM (RDRAM), etc.), a static memory 806 (e.g., flash memory, static random access memory (SRAM), etc.), and a data storage device 816, which communicate with each other via a bus 830.

Processor (processing device) 802 represents one or more general-purpose processing devices such as a microprocessor, central processing unit, or the like. More particularly, the processor 802 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 can also be one or more special-purpose processing devices such as an application specific integrated circuit (ASIC), a field programmable gate array (FPGA), a digital signal processor (DSP), network processor, or the like. The processor 802 is configured to execute instructions 805 (e.g., improving precision of content matching systems at a platform) for performing the operations discussed herein.

The computer system 800 can further include a network interface device 808. The computer system 800 also can include a video display unit 810 (e.g., a liquid crystal display (LCD) or a cathode ray tube (CRT)), an input device 812 (e.g., a keyboard, and alphanumeric keyboard, a motion sensing input device, touch screen), a cursor control device 814 (e.g., a mouse), and a signal generation device 818 (e.g., a speaker).

The data storage device 816 can include a non-transitory machine-readable storage medium 824 (also computer-readable storage medium) on which is stored one or more sets of instructions 805 (e.g., improving precision of content matching systems at a platform) embodying any one or more of the methodologies or functions described herein. The instructions can also reside, completely or at least partially, within the main memory 804 and/or within the processor 802 during execution thereof by the computer system 800, the main memory 804 and the processor 802 also constituting machine-readable storage media. The instructions can further be transmitted or received over a network 820 via the network interface device 808.

In one implementation, the instructions 805 include instructions for providing fine-grained version histories of electronic documents at a platform. While the computer-readable storage medium 824 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:

providing event data associated with a plurality of client devices of a cloud-based environment as input to a trained artificial intelligence (AI) model, wherein the event data indicates activities performed with respect to the plurality of client devices;

obtaining one or more outputs of the trained AI model, the one or more outputs indicating:

a set of activities, of the activities indicated by the event data, performed with respect to at least one of the plurality of client devices that is indicative of a security breach, a plurality of security actions to be taken at the cloud-based environment in response to the set of activities, and for each of the plurality of security actions, a level of confidence indicating a likelihood that a respective security action will successfully mitigate the security breach;

selecting, among the plurality of security actions, a security action based on a comparison of the respective levels of confidence of the plurality of security actions; and performing a set of operations to initiate the security action at the cloud-based environment.

2. The method of claim 1, further comprising:

providing indicator of compromise (IOC) data as input to the trained AI model with the provided event data, wherein the IOC data indicates one or more activities pertaining to one or more other security breaches of other cloud-based environments, wherein the at least one of the set of activities corresponds to the one or more activities indicated by the IOC data.

3. The method of claim 2, further comprising:

updating the IOC data to include information pertaining to the set of activities that is indicative of the security breach.

4. The method of claim 1, wherein the set of operations to initiate the determined security action comprise an operation associated with one or more of:

transmitting a security alert to a computing system associated with a security authority associated with the determined security action;

executing one or more instructions to prevent at least one of the one or more client devices from performing one or more operations for a particular time period;

executing one or more instructions to prevent at least one of the one or more client devices from accessing a particular type of data; or executing one or more instructions to prevent at least one of the one or more client devices from communicating with another client device.

5. The method of claim 1, wherein performing the set of operations to initiate the security action at the cloud-based environment comprises:

determining whether the level of confidence of the security action exceeds a threshold level of confidence; and responsive to determining that the level of confidence of the security action exceeds the threshold level of confidence, executing one or more instructions of a security action protocol associated with the security action.

6. The method of claim 5, further comprising:

responsive to determining that the level of confidence of the security action does not exceed the threshold level of confidence, transmitting a security alert to a computing system associated with a security authority associated with the security action.

7. The method of claim 1, wherein the activities indicated by the event data comprise one or more of processing activities, data access activities, or network-based activities performed with respect to at least one client device of the plurality of client devices.

8. A system comprising:

a memory; and a processing device coupled to the memory, the processing device to perform operations comprising:

generating training data for an AI model, wherein generating the training data comprises:

generating a training input comprising historical event data indicating one or more historical activities performed with respect to at least one of a plurality of client devices of a cloud-based environment; and generating a target output comprising:

an indication of whether the one or more historical activities of the client devices were previously indicated by a security authority to be indicative of a historical security breach and, for the one or more historical activities, a corresponding mapping to one or more historical security actions initiated by the security authority at the cloud-based environment in response to the historical activity to mitigate the historical security breach; and providing the training data to train the AI model to predict activities performed with respect to the plurality of client devices that are indicative of a security breach and one or more security actions to mitigate the security breach, wherein the training data comprises (i) a set of training inputs comprising the training input and (ii) a set of target outputs comprising the target output.

9. The system of claim 8, wherein the one or more historical activities comprise one or more of historical processing activities, historical data access activities, or historical network-based activities performed with respect to at least one client device of the plurality of client devices.

10. The system of claim 8, wherein the one or more historical security actions comprise at least one of:

executing one or more instructions to prevent at least one of the plurality of client devices from performing one or more operations for a particular time period;

executing one or more instructions to prevent at least one of the plurality of client devices from accessing a particular type of data; or executing one or more instructions to prevent at least one of the plurality of client devices from communicating with another client device.

11. The system of claim 8, wherein at least one of the training input or the target output is further generated based on one or more of security rule data associated with a user of the plurality of client devices or indicator of compromise data collected for the cloud-based environment or another cloud-based environment.

12. The system of claim 8, wherein the operations further comprise:

identifying a security log comprising an indication of historical activities previously initiated by the security authority in response to the one or more historical activities of the client devices; and extracting the one or more historical activities from the identified security log.

13. The system of claim 12, wherein the AI model is associated with a platform, and wherein the security log is associated with at least one of the platform or another platform.

14. A non-transitory computer readable storage medium comprising instructions for a server that, when executed by a processing device, cause the processing device to perform operations comprising:

providing event data associated with a plurality of client devices of a cloud-based environment as input to a trained artificial intelligence (AI) model, wherein the event data indicates activities performed with respect to the plurality of client devices;

obtaining one or more outputs of the trained AI model, the one or more outputs indicating:

a set of activities, of the activities indicated by the event data, performed with respect to at least one of the plurality of client devices that is indicative of a security breach, a plurality of security actions to be taken at the cloud-based environment in response to the set of activities, and for each of the plurality of security actions, a level of confidence indicating a likelihood that a respective security action will successfully mitigate the security breach;

selecting, among the plurality of security actions, a security action based on a comparison of the respective levels of confidence of the plurality of security actions; and performing a set of operations to initiate the security action at the cloud-based environment.

15. The non-transitory computer readable storage medium of claim 14, wherein the operations further comprise:

providing indicator of compromise (IOC) data as input to the trained AI model with the provided event data, wherein the IOC data indicates one or more activities pertaining to one or more other security breaches of other cloud-based environments, wherein the at least one of the set of activities corresponds to the one or more activities indicated by the IOC data.

16. The non-transitory computer readable storage medium of claim 15, wherein the operations further comprise:

updating the IOC data to include information pertaining to the set of activities that is indicative of the security breach.

17. The non-transitory computer readable storage medium of claim 14, wherein the set of operations to initiate the determined security action comprise an operation associated with one or more of:

transmitting a security alert to a computing system associated with a security authority associated with the determined security action;

executing one or more instructions to prevent at least one of the one or more client devices from performing one or more operations for a particular time period;

executing one or more instructions to prevent at least one of the one or more client devices from accessing a particular type of data; or executing one or more instructions to prevent at least one of the one or more client devices from communicating with another client device.

18. The non-transitory computer readable storage medium of claim 14, wherein performing the set of operations to initiate the security action at the cloud-based environment comprises:

determining whether the level of confidence of the security action exceeds a threshold level of confidence;

responsive to determining that the level of confidence of the security action exceeds the threshold level of confidence, executing one or more instructions of a security action protocol associated with the security action.

19. The non-transitory computer readable storage medium of claim 18, wherein the operations further comprise:

responsive to determining that the level of confidence of the security action does not exceed the threshold level of confidence, transmitting a security alert to a computing system associated with a security authority associated with the security action.

20. The non-transitory computer readable storage medium of claim 14, wherein the activities indicated by the event data comprise one or more of processing activities, data access activities, or network-based activities performed with respect to at least one client device of the plurality of client devices.

* * * * *